F. ROURK. 2 Sheets—Sheet 1.

Assignor to W. W. GILES.

MANUAL POWER MACHINE.

No. 9,953. Reissued Nov. 29 1881.

Attest:
C. Clarence Poole
J. C. Turner

Inventor:
Francis Rourk
By his Atty
R. D. Smith

N. PETERS, Photo-Lithographer, Washington, D. C.

F. ROURK.

2 Sheets—Sheet 2.

Assignor to W. W. GILES.

MANUAL POWER MACHINE.

No. 9,953.

Reissued Nov. 29 1881.

Attest:
C. Clarence Poole
J. C. Turner

Inventor:
Francis Rourk
By his Atty
R. D. O. Smith

N. PETERS. Photo-Lithographer, Washington, D. C.

UNITED STATES PATENT OFFICE.

FRANCIS ROURK, OF ERIE, PENNSYLVANIA, ASSIGNOR TO WILLIAM W. GILES, OF CHICAGO, ILLINOIS.

MANUAL-POWER MACHINE.

SPECIFICATION forming part of Reissued Letters Patent No. 9,953, dated November 29, 1881.

Original No. 90,310, dated May 18, 1869. Application for reissue filed May 24, 1881.

*To all whom it may concern:*

Be it known that I, FRANCIS ROURK, M. D., of Erie, in the county of Erie and State of Pennsylvania, have invented a new and Improved Apparatus for Operating Mechanisms by Manual Power; and I do hereby declare the following to be a full and exact description of the same, reference being had to the accompanying drawings, which form a part of this specification, and the letters of reference marked thereon.

The nature of my invention consists in a combination of levers and cranks in such a position as to enable a man to operate them with ease, to greatly increase his natural force by combining the power derived from his weight with that derived from his muscular force. The said power may be applied to a variety of purposes. For convenience, in the accompanying drawings I have represented it as applied to the propelling of a velocipede. It may, with equal ease, be applied to the propelling of a shaft, from which any kind of machinery may be operated by any desired mode of communicating power and motion.

Figure 1:
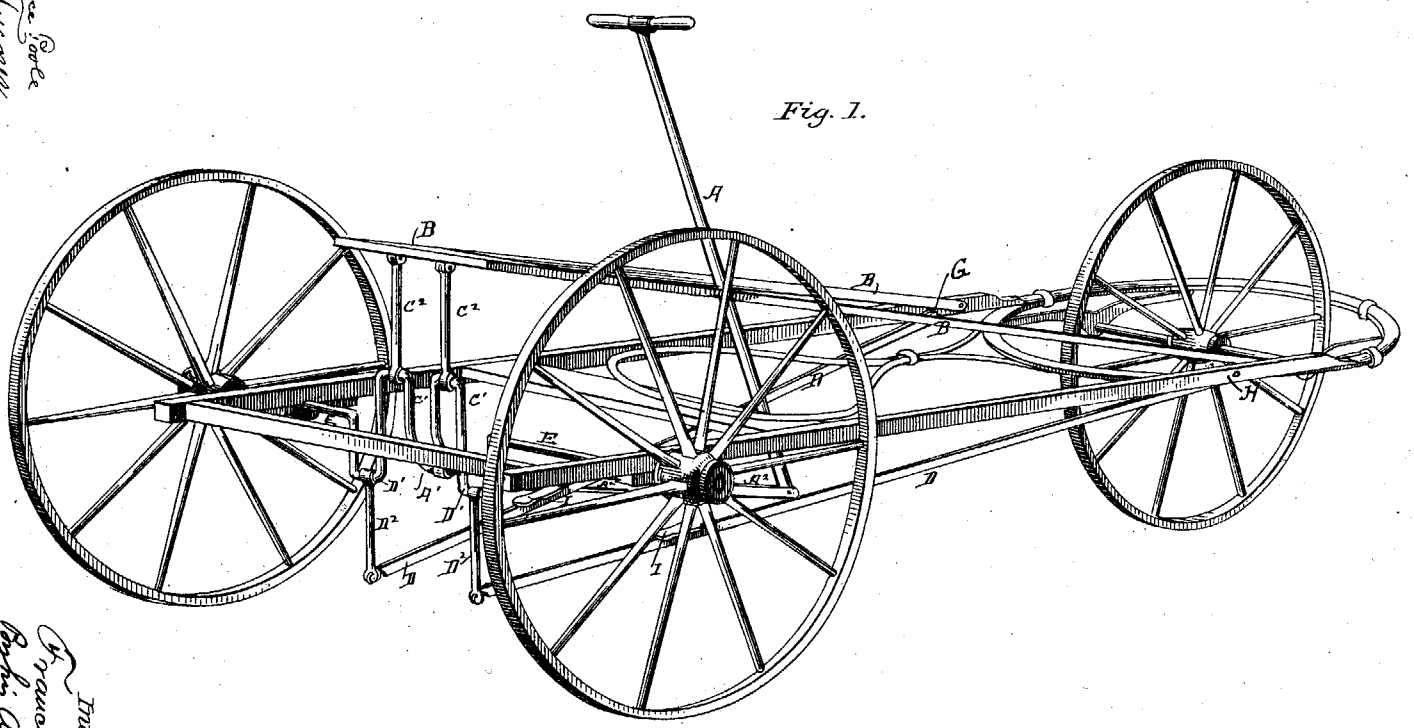
Figure 2:
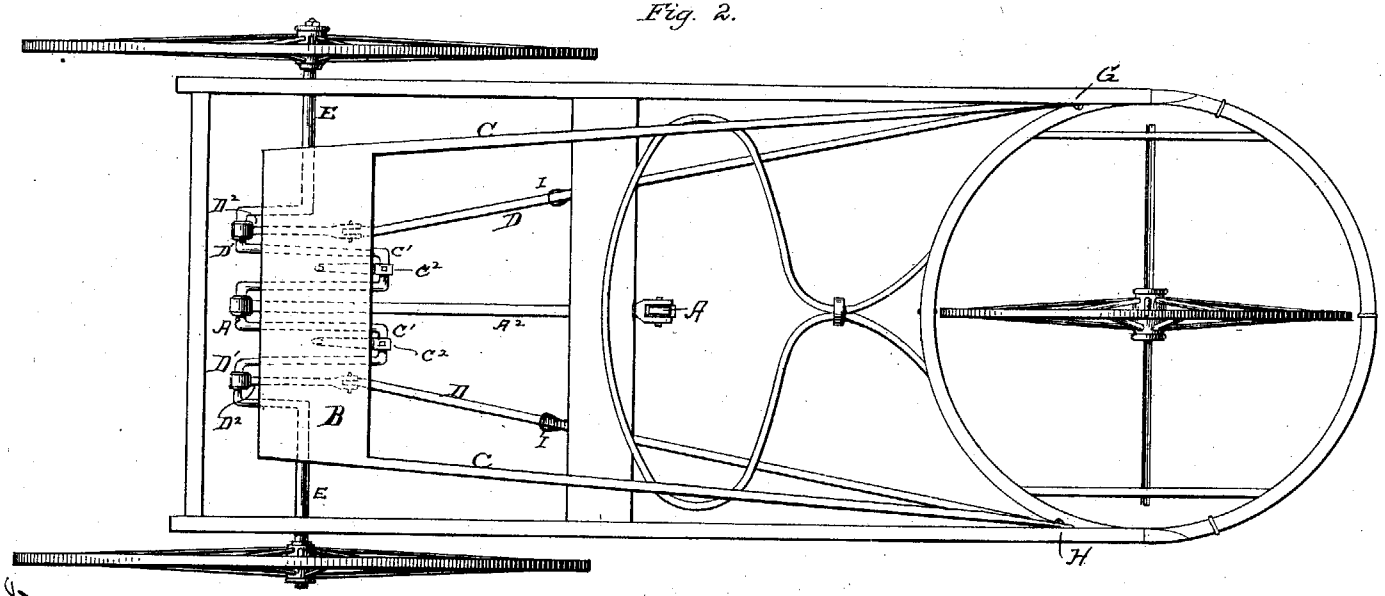

In the accompanying drawings, Figure 1 is a perspective view, and Fig. 2 is a top view, of my machine as applied to the propelling of a velocipede.

In the drawings can be seen the shaft or axle E, with its five cranks, D′ D′, C′ C′, and A′, the levers D D, C C, and A, together with the connecting-rods $D^2$ $D^2$, $C^2$ $C^2$, and $A^2$.

The manner in which I construct one of my machines is as follows: I first construct a main shaft or axle, E, with the five cranks D′ D′, C′ C′, and A′, as shown in the drawings. To each of these cranks I attach connecting-rods or pitmen as follows: To the cranks D′ and D′, I attach the connecting-rods $D^2$ and $D^2$, which connect with the foot stirrups or levers D and D. To the cranks C′ and C′, I attach the connecting-rods $C^2$ and $C^2$, which connect with the levers C and C at the seat B; and to the crank A′, I attach the connecting-rod $A^2$, which connects with the lever A, which has its fulcrum on the cross-bar K. The foot stirrups or levers D D, C and C have their fulcra at their extremities farthest from the axle or shaft E—as, for example, at the points G and H. The levers C and C are connected at their extremities nearest to the axle E by a cross-bar, B, which serves as a seat for the operator, and to the under side of which the pitmen $C^2$ and $C^2$ are attached by means of staples, thereby giving play-room for the oscillating motion of the said pitmen.

The manner in which my machine is operated is as follows: The operator seats himself on the seat B and places his feet in the stirrups I I on the foot-levers D D, and then grasps the lever A with his hand. He then (supposing the machine to stand as indicated in Fig. 1) pushes the lever A from him, bearing his whole weight on the seat B, continuing to do so till it reaches its lowest point. He then transfers his weight to the foot stirrups or levers D and D by standing on his feet, and draws the lever A toward him. This causes a complete revolution of the shaft, and, of course, the operation is so continued.

It will be noticed that by means of the levers, arranged, as described, to be actuated by the operator's own weight and the action of the hand-lever A, as described, he is enabled to increase the power derived from his own weight by the amount of muscular force which he may be enabled to exert upon said hand-lever, thus making the power of the machine much more than that of a man acting by his weight or by his muscular force alone.

Having described my invention, what I claim as new is—

1. The combination and arrangement, in a manual-power machine, of a pivoted hand-lever, foot-levers, and an actuating-seat and crank-shaft, in such relation that when the operator is seated in position to operate the machine the upper end of the hand-lever vibrates to and fro in front of the body and the lower part vibrates between his feet, substantially as specified.

2. In a manual-power machine, the combination of hand and foot levers, a vibrating actuating-seat, and a crank-shaft, so connected that the weight of the operator upon the seat tends to actuate the hand-lever and mechanism in one direction.

3. In a manual-power machine having a suitable supporting frame-work, a pivoted hand-lever, in combination with an actuating-seat lever and foot stirrups or levers, and a crank-shaft, so arranged and operating that the alternate transfer of the operator's weight from the seat-lever to the foot-stirrups actuates the mechanism, substantially as specified.

4. In a manual-power machine, a main shaft provided with cranks, combined with an actuating-seat lever, one or more foot stirrups or levers, and a hand-lever connected with said cranks respectively, whereby the operator may alternately impose his weight upon said levers respectively, and may simultaneously re-enforce his weight with his muscular power in actuating the mechanism.

5. In a manual-power machine, the combination of a crank-shaft, a seat-lever, one or more foot stirrups or levers, and a hand-lever, when said levers are placed with relation to each other so that in operation the force exerted upon the hand-lever reacts upon the seat or foot-braces, respectively.

6. The shaft E, the cranks $D'$ $D'$, $C'$ $C'$, and $A'$, the connecting-rods $D^2$ $D^2$ $C^2$ $C^2$ $A^2$, and the levers D D, C C, and A, or their equivalent, when arranged and operated substantially as described, and for the purpose set forth.

7. In a manual-power machine, the combination of a crank-shaft, a seat-lever, foot stirrups or levers, and a hand-lever, all coupled so as to move in unison, whereby the operator may employ his weight and his muscular force simultaneously and in co-operation to propel the machine.

FRANCIS ROURK.

Witnesses:
WILLIAM JONES,
THOS. WILSON.